United States Patent [19]

Kinsley, Jr.

[11] Patent Number: 4,923,646
[45] Date of Patent: May 8, 1990

[54] METHOD AND APPARATUS FOR THE MANUFACTURE OF FIBRIDS

[75] Inventor: Homan B. Kinsley, Jr., Powhatan, Va.

[73] Assignee: James River Corporation, Richmond, Va.

[21] Appl. No.: 268,470

[22] Filed: Nov. 8, 1988

[51] Int. Cl.$^5$ .............................................. B29B 9/10
[52] U.S. Cl. ............................................ 264/13; 425/6
[58] Field of Search .................. 264/9, 13, 14; 425/6, 425/10; 162/157.2, 157.3, 157.4, 157.5

[56] References Cited

U.S. PATENT DOCUMENTS

| | | | |
|---|---|---|---|
| 2,988,782 | 6/1961 | Guandique et al. | 264/13 X |
| 3,081,519 | 3/1963 | Blades et al. | 264/5 |
| 3,227,784 | 1/1966 | Blades et al. | 264/205 |
| 4,054,625 | 10/1977 | Kozlowski et al. | 264/13 |
| 4,104,341 | 8/1978 | Keppler et al. | 264/9 |
| 4,183,881 | 1/1980 | Griffin et al. | 264/13 |
| 4,211,737 | 7/1980 | Didrusco et al. | 264/12 |
| 4,332,749 | 6/1982 | Pleska | 264/13 |
| 4,734,227 | 3/1988 | Smith | 264/13 |
| 4,778,835 | 10/1988 | Sittel et al. | 523/315 |

OTHER PUBLICATIONS

Petersen et al. "The Formation of Polymer Fibers From the Rapid Expansion of Supercritical Fluid Solutions" Polymer Eng. & Sci., Dec. 1987, vol. 27, No. 22, pp. 1693–1696.

Primary Examiner—Jan H. Silbaugh
Assistant Examiner—Mary Lynn Fertig
Attorney, Agent, or Firm—Burns, Doane, Swecker & Mathis

[57] ABSTRACT

A method and apparatus for the formation of polymer fibrids. These fibrids are produced by the mixing of superheated water and melted polymer and by passing this mixture through a bank of capillary tubes. The mixture becomes elongated in the capillary tubes and exits those tubes through a nozzle into an expansion chamber where they form fibrids. The fibrids are cooled by the evaporation of liquid water after expansion.

35 Claims, 1 Drawing Sheet

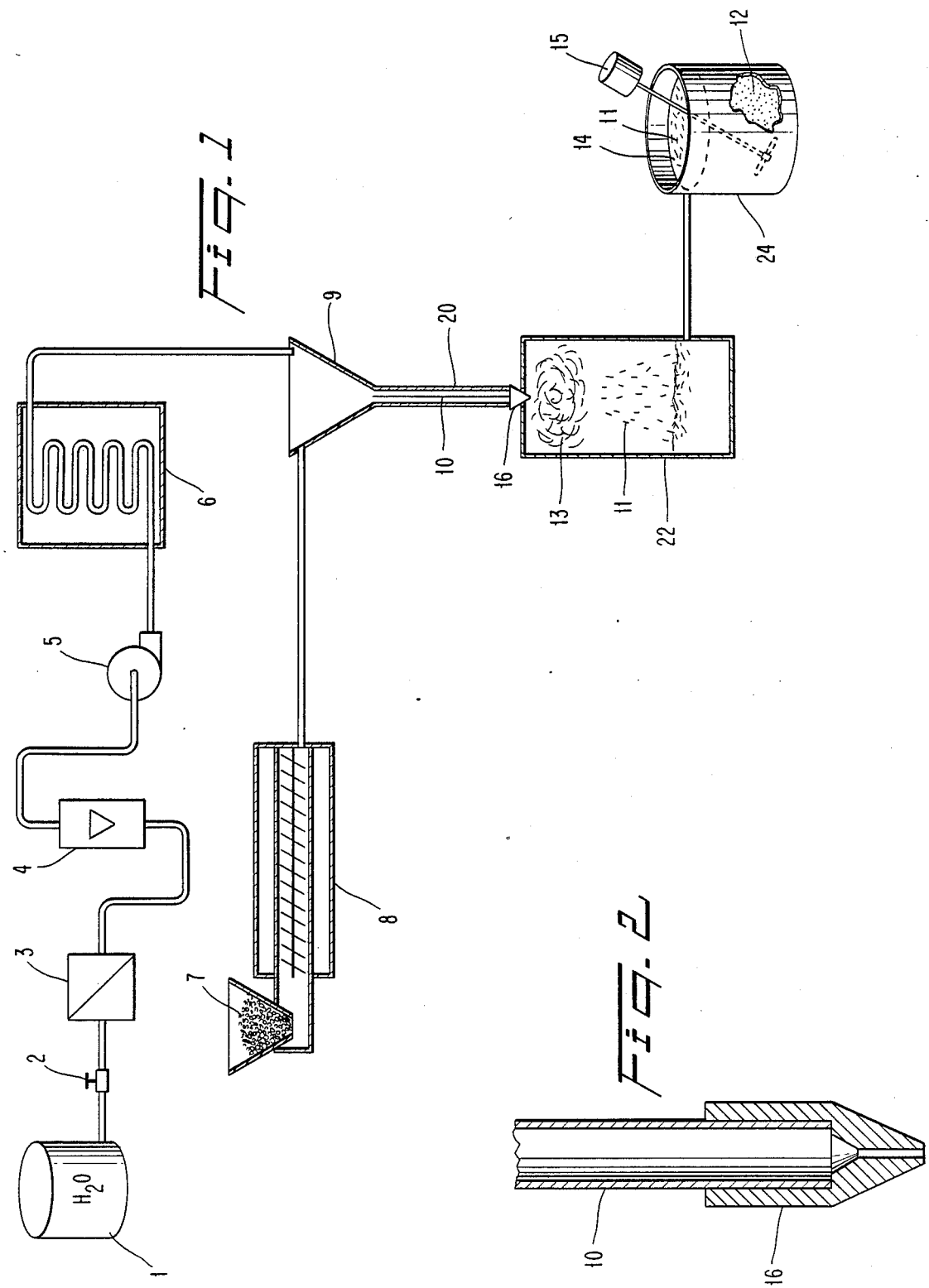

METHOD AND APPARATUS FOR THE MANUFACTURE OF FIBRIDS

BACKGROUND OF THE INVENTION

The present invention relates to fibrids and their production. In particular, the present invention relates to a process and apparatus for the production of fibrids.

Various processes and apparatus are known which permit the direct production of fibrids. One typical process involves the technique of abruptly expanding a solution of molten polymer by passing it through a suitable orifice. An example of this technique can be found in U.S. Pat. No. 4,332,749. Other examples of known techniques for producing fibrids include that disclosed in Belgian Pat. No. 824,531 in the name of Solvay and Cie., which proposes to produce fibrids by subjecting, to abrupt expansion, a solution containing a polyolefin, which has been subjected to a prior oxidation treatment, and a polar monomer which can be grafted onto the polyolefin. This process involves carrying out two successive steps, which complicates the process and increases the cost and price of the fibrids produced.

In order to avoid resorting to a process involving two successive steps, Belgian Pat. No. 847,491, in the name of Solvay and Cie., proposes to incorporate, in the molten polymer/solvent mixture subjected to the abrupt expansion, a polar monomer which can be grafted onto the polymer used, and to cause the grafting onto the polymer before the abrupt expansion. However, this process exhibits another serious disadvantage. In fact, a secondary reaction in which the polar monomer is grafted onto the solvent causes the formation of oligomers, consisting of grafted solvent, which oligomers are subsequently found in the water in which the produced fibrids are suspended, and the hydrolysis of which leads to corrosive products. This reaction also causes the loss of some of the polar monomer and solvent. These processes also exhibit a common disadvantage, namely that the grafted polyolefin is grafted throughout its bulk, whereas, in order to ensure an adequate compatibility between the polyolefin fibrids and the cellulose pulp in the case of suspending the fibrids in water, it suffices for the fibrids to be grafted on their surface. The known processes thus involve the use of a large excess of polar monomer, relative to the amount which is actually necessary.

Another conventional process for producing fibrids is disclosed in U.S. Pat. No. 2,988,782. This process involves a solution of a wholly synthetic polymer which is added to a precipitant for the polymer under shear conditions such that the system has a precipitation number of at least 100. However, this process requires some rather complex calculations to determine the precipitating number. Further, this process is limited to polymers for which a solvent and solvent miscible precipitant can be found.

Furthermore, these processes for the production of fibrids require the use of organic solvents and/or organic solvent/non-solvent mixtures. The recovery, storage and disposal of these organic solvents constitutes a major cost.

Fibrids may also be formed by melt blowing. In the conventional melt blowing process, polymer is melted, forced through a spinnerette, and drawn to a fine fiber diameter by a blast of hot air at a temperature ranging from about 500° to 600° F. It is necessary to chill the hot, fine diameter fiber immediately after it is formed so that it does not shrink back to a larger diameter fiber or a ball of melted polymer. In an attempt to alleviate the situation, current technology employs the use of a water spray to cool the melted polymer strands. However, it is impossible during the melt-blowing process to achieve sufficient cooling to optimize the fibrid yield.

In fact, none of these processes describe an adequate method for cooling fibrids and maximizing the fibrid yield. Thus there remains a need for a simple, inexpensive and efficient method for manufacturing fibrids which advantageously does not involve the use and recovery of organic solvents, yet which provides for optimum fibrid yield.

SUMMARY OF THE INVENTION

Therefore, it is an object of the present invention to provide a method for the manufacture of fibrids which is simple, yet efficient.

It is also an object of the present invention to provide an apparatus for the manufacture of fibrids which is inexpensive and simple to operate.

It is further an object of the present invention to provide an apparatus and method for the production of fibrids which does not require the use of organic solvents.

It is still further an object of the present invention to provide a method and apparatus for the production of fibrids which maximizes the yield thereof.

These and other objects are accomplished by the present invention.

In accordance with the foregoing, and in one aspect of the present invention, there is provided a process for the manufacture of fibrids. This process involves mixing melted and pressurized polymer with superheated water such that a suspension of polymer droplets and superheated water is formed. This suspension of droplets and superheated water is then passed through at least one bank of capillary tubes wherein the molten polymer droplets become pre-fibrids. These pre-fibrids result from the elongation of the molten polymer droplets as they are acted upon by the shear present in the capillary tubes. The water/pre-fibrid mixture is passed through a nozzle and then allowed to expand into a chamber at a lower pressure and temperature, thus forming fibrids.

In accordance with another aspect of the present invention, there is provided an apparatus for the manufacture of fibrids. The apparatus includes a means for melting and pressurizing polymer connected to a means for transporting the melted pressurized polymer to a mixing chamber, a means for pressurizing and heating water and for transporting the water to a mixing chamber in a continuous fashion, a chamber in which the polymer and water are mixed and sheared, at least one bank of capillary tubes useful in the formation of pre-fibrids connected at a first end to the mixing chamber, a nozzle connected to a second end of the bank of capillary tubes for restricting flow and maintaining a pressure differential between the aforementioned system and an expansion chamber which is also provided and into which the nozzle aperture opens.

BRIEF DESCRIPTION OF THE DRAWINGS

Preferred embodiments of the present invention will be described in greater detail with reference to the accompanying drawings wherein like members bear like referenced numerals and wherein:

FIG. 1 is a schematic representation of the apparatus embodying a preferred embodiment of the present invention.

FIG. 2 is a cross-sectional view in expanded scale of a preferred embodiment of a capillary tube and nozzle arrangement according to the present invention.

DETAILED DESCRIPTION OF THE PREFERRED EMBODIMENTS

By fibrids, it is understood to mean small, non-granular, non-rigid, fibrous or film-like particles. Two of their three dimensions are on the order of microns. Their smallness and suppleness allow them to be readily deposited in physically entwined configurations such as fiber mats.

Fibrids can be manufactured in accordance with the present invention from a wide variety of polymer materials. The only criteria is that the polymer is not water soluble, it can be melted, and it does not react or degrade when in contact with water. Polymers that can be used are: acrylics, cellulose esters, cellulose ethers, fluoroplastics, liquid crystals, nitriles, nylons, polyphenylene ethers, polyacrylates, polybutylenes, polyesters, polyethylene, ethylene vinyl acetates, ethylene acid copolymers, ethylene ethyl acrylates, ethylene methyl acrylates, ionomers, polyphenylene sulfides, polymethylpentenes, polyproplyene homopolymers and copolymers, styrenic resins, ABS, polysulfones, vinyl resins, vinlyidene chlorides, and mixtures and copolymers thereof. It is not necessary for the polymers to be mutual miscible for mixtures of the polymers to be used to form fibrids.

Thermoset resins like phenol-formaldehyde or urea formaldehyde are not suitable because they do not melt. Other unsuitable polymers are cellulose and starch. The acetals are not suitable because they react with high temperature water.

According to a preferred embodiment of the method of the present invention, the fibrids are prepared by the following steps.

The polymer is melted in an extruder and extruded at a temperature of from about 400° to about 650° F. and at a pressure of from about 250 to about 3,000 psia.

The melted polymer is then converted into the fibrid by the following steps. First, the melted polymer is mixed with superheated water, which is preferably at the same temperature as the polymer. During the mixing, polymer droplets are formed. These polymer droplets are then converted into prefibrids by the shear forces involved in passage through a capillary tube, with the prefibrids finally being elongated into a fibrid.

More specifically, in the first step, i.e., the mixing of melted polymer with superheated water, the melted polymer is transported to a mixing chamber. Simultaneously, superheated water is continuously added to the mixing chamber. By superheated water it is understood to mean water that has been pressurized and heated. The pressure is sufficient to prevent the water from changing phase from liquid to vapor. The water is superheated in the sense that if it were allowed to return to atmospheric pressure (14.6 psia), it would possess sufficient thermal energy to convert part of the liquid to vapor. As used in accordance with the present invention, water is never heated beyond its critical temperature (705° F., 3206 psig) because it will then form only superheated steam when allowed to expand to atmospheric pressure. It is necessary to pressurize the water to keep it in a superheated liquid state. At 400° F. it must be kept at over 250 psia and at 650° F. it must be kept at over 2209 psia. This mixture of superheated water and melted polymer is maintained in the mixing chamber in a ratio such that the water to polymer mass is from about 1:1 to about 40:1. The polymer and water mixture is subjected to shear in the mixing chambers to thereby produce melted polymer droplets which are surrounded by superheated liquid water forming a suspension.

According to the second step of the process, the suspended molten polymer droplets then enter into the individual capillary tubes of the bank of capillary tubes and are elongated into pre-fibrids by a shear force which occurs when the melted polymer/superheated water mixture is passed through the capillary tubes. By pre-fibrids it is understood to mean the shear elongated droplets of polymer.

In the final step, the prefibrid is drawn into a fibrid by the explosive expansion of the water surrounding the pre-fibrid. This occurs as the prefibrid/water suspension passes through the capillary tube, the suspension passes through a nozzle which is located at the (second) end of each of the individual capillary tubes. In an alternative embodiment, a single nozzle is attached to the end of an entire bank of such tubes such that the molten pre-fibrid superheated water suspension exiting from all of the individual capillary tubes enters the expansion chamber through a common aperature. The nozzle acts to restrict the flow of the suspension of pre-fibrids and superheated water and maintains the pressure in the system to prevent the premature expansion of the superheated water into vapor.

When the water and polymer pre-fibrid suspension passes through the nozzle, part of the liquid water explodes into vapor. This violent expansion supplies the energy to draw the pre-fibrids into fibrids.

The temperature and the water polymer mass is preferably preselected so that not all of the mass of the water is flashed into vapor. Thus, the water polymer ratio is quite important. There must generally be sufficient liquid water present after the expansion to room pressure to cool the hot polymer fibrids by evaporation of the remaining water liquid. The minimum value for the water to polymer ratio can be calculated by solving a mass-energy balance. For example, the following defines the minimum water to polymer ratio if the system is started at 600° F. The heat consumed by the evaporation of liquid water is: (lbs water) (enthalpy evaporation). The heat energy given off by the cooling of the water and the polymer is: (lbs water) (600−212) (1)+(lbs polymer) (600−212)(0.35) where the specific heat of water is about 1 BTU/lbs/°F. and the specific heat of the polymer is about 0.35 BTU/lbs/°F. If the quantity (X) is equal to the water/polymer ratio then (X) (547) equals (X) (600−212)(1) plus (1)(600−212) (0.35) where the value for the enthalpy of the evaporation is 547 BTU/lbs. Solving the equation (X) equals 0.85. This means that if there is 0.85 lbs of water per lb of polymer and if the mixture is heated to 400° F., then there will be sufficient water present to cool the polymer to 212° F. after the expansion. If the water temperature is maintained below 705° F. at 3206 psia pressure, then there will be sufficient consumption of thermal energy by the conversion of liquid water to water vapor that the final temperature will be 212° F. prior to external cooling.

The fibrid forming apparatus in accordance with the present invention is illustrated in FIG. 1. The apparatus includes: means for superheating water and for transporting the superheated water to a mixing chamber in a continuous fashion; means for melting and pressurizing a polymer and for transporting the melted pressurized polymer to the mixing chamber; a mixing chamber for mixing the superheated water and the heated and pressurized polymer; at least one bank of capillary tubes attached at a first end to the mixing chamber; a nozzle connected to a second end of the bank of capillary tubes; and an expansion chamber into which the nozzle opens.

The water pressurizing and heating means can comprise a water supply 1, a valve 2, a filter 3, a rotometer 4, a high pressure pump 5, and a heater 6. The flow rate of the water can be controlled by using a positive displacement pump. The energy supplied to the heater can be in the form of electrical or combustion. The operation of these components produces hot (400° to 650° F.) water at pressures sufficient to prevent boiling (250 psia to 2209 psia). This superheated water is then transported in continuous fashion to a mixing chamber 9.

The polymer melting and pressurizing is conducted by use of a polymer extruder. Polymer pellets 7 are fed into the extruder 8 which melts the polymer and forces it into either the mixing chamber 9 directly, or through a series of pipes and ducts emptying into the mixing chamber 9. The barrel of the extruder can be heated electrically or by using an external source of energy.

The melted polymer and the superheated hot water are combined in a mixing chamber 9. The two fluids are sheared by passage through, preferably, a static mixer such as manufactured by Cleveland Static Mixing Systems. Other technologies for mixing the fluid streams, such as rotating blades, may also be used. During passage through the mixer, the melted polymer forms small droplets which form a suspension, i.e., droplets surrounded by the superheated water. These droplets are the small bits of polymer which will be formed into pre-fibrids and then into fibrids in subsequent steps. The most useful size of fibrid is approximated by a cylinder 0.1 to 2 micrometer in diameter with a length to diameter ratio of from 5 to 1 to 100 to 1. This roughly corresponds to a polymer droplet size of from about $3.9 \times 10^{-15}$ cubic centimeters to $6.3 \times 10^{-10}$ cubic centimeters. Expressed as spheres, the diameters of the droplets would be about $2 \times 10^{-5}$ centimeters to about $1.1 \times 10^{-3}$ centimeters, respectively. The size of the polymer droplet depends on the polymer to water ratio, and the degree of mixing which occurred in the mixing section. Obviously, smaller droplets will form smaller pre-fibrids.

The bank 20 of capillary tubes 10 consists of one or more tubes 10 with a small inside diameter having a first end connected to the mixing chamber 9 at the exit therefrom. The melted polymer droplet suspension is influenced by the shear field which is a characteristic of the passage of any fluid or suspension through a capillary. This shear will elongate the polymer droplet into a pre-fibrid. The number of capillary tubes 10 in this section will depend on the throughput. For simplicity, this section has been drawn, in FIG. 2, with a single capillary tube 10 and a nozzle 16 attached directly thereto. Polymer with lower melt viscosity will require less shear to elongate into pre-fibrids. For such polymers, short capillary tubes and/or larger diameter capillary tubes will be sufficient. For polymer droplets with high melt viscosity, the capillary tubes must be longer and/or smaller in diameter.

The high temperature, high pressure water/pre-fibrid suspension is allowed to expand through the nozzle 16 to room pressure in the expansion chamber 22. The mixture is thus transformed into water vapor 13 and fibrid 11. The expansion of the superheated water is explosive. Since the water was below the critical point (705° F. and 3,206 psia) there is insufficient heat to convert all the liquid water into water vapor. The liquid water that remains after the expansion is in intimate contact with the hot fibrid. The heat of the fibrids is transferred to the remaining liquid water causing the droplets of water evaporate thus cooling the polymer and producing more water vapor. Thus, the rapid expansion of the superheated water converts the pre-fibrids into fibrids. These finally formed fibrids may optionally be additionally cooled by the use of a spray of cool water (below 212° F.) or by use of a quench bath containing liquid water. The fibrids 11 may then be collected in a tank 24 which is partly filled with liquid water 14. The fibrids are next agitated with a mixer 15 in the tank 24 to form a pumpable slurry 12.

The principles, preferred embodiments and modes of operation of the present invention have been described in the foregoing specification. The invention which is intended to be protected herein, however, is not to be construed as limited to the particular embodiments disclosed, since these are to be regarded as illustrative rather than restrictive. Variations and changes may be made by others without departing from the spirit and scope of the invention.

What is claimed is:

1. A method for the manufacture of fibrids comprising the steps of:
    (a) mixing a melted polymer and superheated water;
    (b) forming a suspension of molten polymer droplets suspended in said superheated water;
    (c) passing said suspension through at least one bank of capillary tubes wherein said molten polymer droplets are elongated to form pre-fibrids suspended in said superheated water due to shear forces acting upon the droplets during their passage through the bank of capillary tubes;
    (d) allowing said pre-fibrid/superheated water suspension to exit from the capillary tubes and pass into an environment of lower pressure and temperature thereby expanding said superheated water such that polymer fibrids are formed.

2. The method of claim 1 wherein said melted polymer is at a temperature of between about 400° and about 650° F.

3. The method of claim 1 wherein said molten polymer droplets are at a temperature of between about 400° and about 650° F.

4. The method of claim 1 wherein said pre-fibrids are at a temperature of between about 400° and about 650° F.

5. The method of claim 1, wherein said superheated water of steps (a), (b) and (c) is at a temperature of between about 400° and about 650° F.

6. The method of claim 1, wherein said melted polymer and said superheated water are maintained at approximately the same temperature prior to expansion.

7. The method of claim 1, wherein said superheated water is at a pressure in steps (a), (b) and (c) sufficient to prevent the formation of steam.

8. The method of claim 7 wherein said superheated water is maintained at a pressure of between about 250 and 3000 psia in steps (a), (b) and (c).

9. The method of claim 8 wherein said melted polymer is at about the same pressure as said superheated water.

10. The method of claim 8 wherein said molten polymer droplets are at about the same pressure as said superheated water.

11. The method of claim 8 wherein said pre-fibrids are at about the same pressure as said superheated water.

12. The method of claim 1 wherein said superheated water to melted polymer mass ratio is from about 1:1 to about 40:1.

13. A method for the manufacture of fibrids comprising the steps of:
 (a) melting a polymer and transporting said melted polymer to a mixing chamber;
 (b) pressurizing and heating water to form superheated water of approximately the same temperature as said melted polymer and transporting said superheated water to said mixing chamber;
 (c) mixing said melted polymer and said superheated water such that a suspension of polymer droplets are formed;
 (d) passing said suspension through at least one bank of capillary tubes wherein said molten polymer droplets are elongated to form pre-fibrids suspended in said super heated water due to shear forces acting upon the droplets during their passage through the bank of capillary tubes;
 (e) allowing said pre-fibrid/superheated water suspension to exit from the capillary tubes and pass into an environment of lower pressure and temperature thereby expanding said superheated water such that polymer fibrids are formed.

14. The method of claim 13 wherein said melted polymer is at a temperature of between about 400° and about 650° F.

15. The method of claim 13 wherein said molten polymer droplets are at a temperature of between about 400° and about 650° F.

16. The method of claim 13 wherein said pre-fibrids are at a temperature of between about 400° and about 650° F.

17. The method of claim 13, wherein said superheated water of steps (b), (c) and (d) is at a temperature of between about 400° and about 650° F.

18. The method of claim 13, wherein said melted polymer and said superheated water are maintained at approximately the same temperature prior to expansion.

19. The method of claim 13, wherein said superheated water is at a pressure in steps (b), (c) and (d) sufficient to prevent the formation of steam.

20. The method of claim 19, wherein said superheated water is maintained at a pressure of between about 250 to 3000 psia in steps (b), (c) and (d).

21. The method of claim 20 wherein said melted polymer is at about the same pressure as said superheated water.

22. The method of claim 20 wherein said molten polymer droplets are at about the same pressure as said superheated water.

23. The method of claim 20 wherein said pre-fibrids are at about the same pressure as said superheated water.

24. The method of claim 13 wherein said superheated water to melted polymer mass ratio is from about 1:1 to about 40:1.

25. A method for the manufacture of fibrids comprising the steps of:
 (a) melting and pressurizing a polymer and maintaining the temperature thereof at between about 400° and 650° F. and the pressure thereof at between about 250 and 3,000 psia;
 (b) transporting said melted polymer to a mixing chamber;
 (c) forming superheated water by heating water and maintaining the temperature thereof at approximately the same temperature as said melted pressurized polymer and by pressurizing said water at a pressure approximately the same as the melted and pressurized polymer;
 (d) transporting said superheated water to said mixing chamber;
 (e) forming a suspension of polymer droplets by mixing said melted polymer and said superheated water;
 (f) forming pre-fibrids in suspension by passing said polymer droplet/superheated water suspension through at least one bank of capillary tubes, whereby the pre-fibrids are formed due to shear forces acting upon the droplets, elongating said droplets, during their passage through the bank of capillary tubes;
 (g) allowing said pre-fibrid suspension to exit from said capillary tubes and pass into an environment of lower pressure and temperature, thereby expanding said superheated water such that polymer fibrids are formed.

26. The method of claim 25, wherein said superheated water to melted polymer mass ratio is from about 1:1 to about 40:1.

27. An apparatus for the manufacture of fibrids comprising:
 a mixing chamber;
 means for superheating and continuously supplying superheated water to said mixing chamber;
 means for melting, heating and transporting polymer material to said mixing chamber;
 a bank of capillary tubes connected at a first end to said mixing chamber;
 a nozzle attached to a second end of said bank of capillary tubes; and
 an expansion chamber into which an aperture of said nozzle opens.

28. The apparatus of claim 27, wherein the means for melting said polymer material is an extruder.

29. The apparatus of claim 27, wherein said mixing chamber is a static mixing chamber.

30. The method of claim 1, wherein a portion of the expanding superheated water in step (d) is flashed to vapor.

31. The method of claim 13, wherein a portion of the expanding superheated water in step (e) is flashed to vapor.

32. The method of claim 25, wherein a portion of the expanding superheated water in step (g) is flashed to vapor.

33. The method of claim 1, wherein the bank of capillary tubes contains more than one capillary tube.

34. The method of claim 13, wherein the bank of capillary tubes contains more than one capillary tube.

35. The method of claim 25, wherein the bank of capillary tubes contains more than one capillary tube.

* * * * *